3,843,451

MICROORGANISM PRODUCTION

David Stewart Roberts, Keston, England, assignor to Burroughs Wellcome Co.

No Drawing. Filed Aug. 16, 1971, Ser. No. 172,309
Claims priority, application Great Britain, Aug. 20, 1970, 40,260/70
Int. Cl. C12k *1/10*
U.S. Cl. 195—102 11 Claims

ABSTRACT OF THE DISCLOSURE

The cultivation of *Fusiformis nodosus* in a liquid culture medium under anaerobic conditions, and the preparation of vaccines from the cultivated organisms. In the cultivation there is provided one or more of the following features: the provision of a carbon dioxide atmosphere: a liver material in the medium: a particular ratio of the volumes of carbon dioxide to liquid medium.

This invention relates to a method of producing a vaccine for the prevention and treatment of foot-rot, especially in sheep.

Ovine foot-rot is a widely-occurring, contagious disease, affecting the epidermal tissues of the foot and caused by the synergic action of two Gram-negative anaerobic bacteria, *Fusiformis nodosus* and *Fusiformis necrophorus*. The disease occurs only when both these organisms are present.

*F. necrophorus* is found normally in the alimentary tract, and is excreted in the faeces, so the organism is usually available in the immediate environment of the sheep's feet to participate in the infection. *F. nodosus*, on the other hand, is unable to survive under natural conditions for more than a few days outside the lesions of foot-rot. The infected foot is its only natural habitat and accordingly *F. nodosus* is described frequently as the specific causal agent of the disease. The elimination of *F. nodosus* from a flock of sheep, which could be accomplished by curing all cases of foot-rot present or by the specific destruction of the organism, would eradicate the disease since *F. necrophorus* cannot cause foot-rot in the absence of *F. nodosus*.

In past years, foot-rot has been controlled by isolation of the infected animals, followed by treatment comprising extensive paring of the affected areas of the feet and external application of disinfectants or antibiotics. More recently, attempts have ben made to check the disease in sheep by vaccination against *F. nodosus* and *F. necrophorus*, but no successful method for an economical large-scale cultivation of *F. nodosus* has been achieved to enable vaccines to be prepared for wide-spread distribution.

Attempts to culture *F. nodosus* successfully have met with difficulties over several years, and as late as 1970 workers were experiencing problems in isolating the organism in pure culture (H. Marsh et al., *The Cornell Veterinarian*, 60, 309–17, April, 1970). Beveridge in 1941 (*Bull. Coun. sci. industr. Res. Aust.*, No. 140) described the cultural requirements of the organism, but met with little success in growing it in liquid media. He described the organism as an obligate anaeroble, and indicated that growth is enhanced in an atmosphere containing 5 to 10 percent carbon dioxide, and even 80 percent of this gas did not inhibit growth. Using a liquid digest of ox muscle and liver, only very slight growth or none at all was obtained, but the addtiion of 10 percent horse serum gave a poor growth.

Greater success in the use of a liquid culture to isolate and subculture *F. nodosus* was obtained by the use of a broth containing ground particles of sheeps hooves and "Difco" trypsin, using an atmosphere of 10 percent carbon dioxide. [J. H. Thomas, *Aust. vet. J.*, 34, 411 (1958)] This work was extended to show that growth was obtained with a liquid medium containing trypsin or a pancreatic extract with the additon of a hoof or wool hydrolysate, casen or proteose peptone. In this work an atmosphere of nitrogen was used to maintain anaeroblosis. [J. H. Thomas, *Aust. vet. J.*, 39, 434 (1963)].

Finally, vaccines prepared from *F. nodosus* for a field trial were made from organisms grown on solid hoof agar containing ground horn under an atmosphere of 10 percent carbon dioxide in hydrogen; and in a biphasic medium of hoof agar overlaid with hoof broth under anaerobic conditions [J. R. Egerton et al., *Aust. vet. J.*, 46, 517 (November 1970)].

In seeking a method for the large-scale culture of *F. nodosus* to prepare a vaccine, attempts to use the conditions and methods employed heretofore for liquid culture have been found unsatisfactory. The use of solid media, such as agar plates, has several disadvantages, in addition to those associated with growing *F. nodosus*: a greater quantity of medium is needed: difficulties attend the sterilisation and incubation process and the collection from surface culture: and thousands of agar cultures, maintained under anaerobic conditions, with commensurate labour expense, are needed. Similar problems attend the use of a biphasic solid/liquid medium.

The use of ground hoof keratin has been widespread in the attempts to culture *F. nodosus* successfully, but unfortunately the use of commercial "Hoof and Horn" meal has been found to inhibit the growth of the organism. Consequently. the use of hoof keratin in a growth medium for the organism would involve the collection of thousands of sheep's hooves; and even then the inclusion of an insoluble powder in a liquid medium is undesirable. When powdered hoof is incorporated into a suitable solid agar medium, the growth of the organism is rather poor even after anaerobic incubation for five days, and the organisms harvested after growth in a liquid medium, previously heated with hoof powder, were not suitably antigenic for subsequent use in a vaccine.

It has now been found that the inclusion of certain liver materials in a liquid nutritive medium for the cultivation of *F. nodosus*, and the provision of a high concentration of available carbon dioxide, are factors which give rise to a substantial increase in both the rate of growth and the yield of the organism under anaerobic conditions. Moreover, the organisms so produced are antigenically satisfactory for vaccination purposes. When almost identical ingredients are used in a solid medium, growth of the organism is greatly improved, and the organisms can be transferred from solid to liquid media, and vice versa, without having to adapt to the new medium, thus obviating any loss due to the selection of a non-antigenic variant, or loss of capacity to grow or elaborate the protective antigen.

Particularly suitable liver materials which have been found to be valuable in carrying out the present invention, are the following preparations, but other equivalent commercial preparations of liver digest, infusion, or extract may be used in their place:

Panmede Liver Digest (Paines and Byrne Limited, Greenford, Middlesex, England).
Liver Infusion (Oxoid Limited, London, S.E.1.)
Liver Digest L27 (Oxoid Limited, London, S.E.1.)

For maximum yields of *F. nodosus*, and for general manufacturing convenience, particularly as regards the rate of growth and times of harvesting, the most preferred concentration of the liver material in a liquid culture medium is in the range of 0.5, 1 and 2% (w./v.) (the weight referring to the dry weight of solids of liver origin), though higher concentrations up to about 3%

(w./v.) may be used, but then the yield is tending to decrease. The effect of varying liver concentrations upon the growth of *F. nodosus* is set forth below in Table (I).

These commercially available liver preparations may be purchased as fine powders which can be dissolved in distilled water to make a solution suitable for inclusion in the liquid culture medium at the desired concentration. Such a solution is preferably clarified to remove particulate matter, for example by filtration, before addition to a culture medium.

For really high yields a liquid culture medium most advantageously contains a digest of pancreas, in addition to the liver material, and common nutritive ingredients of culture media such as yeast extract, peptone or a digest of mammalian horse or ox muscle, and sodium chloride. Preferably, the liquid medium also contains L-cysteine hydrochloride.

The pancreatic material is desirably a pancreatic autodigest, which can be prepared by known methods, but conveniently by the following method. Minced pancreas, for example ox or sheep pancreas, is added to water at a rate of about 0.5 to 1.5 kg. per litre of water, and the pH is raised, for example, by the addition of sodium hydroxide, to between 8 and 9. The mixture is stirred at a temperature of 35° C. to 40° C. for 1 to 2.5 hours, while the pancreas undergoes digestion by its own trypsin, and then the pH is lowered to between 3 and 5, with, for example, hydrochloric acid. Subsequently, it is boiled briefly, and the pH is readjusted to between 7 and 7.8 before the preparation is filtered and the filtrate collected. The pancreatic material in the liquid medium may be replaced by crude trypsin preparations (but not with pure trypsin) such as "Difco" 1:250 trypsin, at a concentration of about 0.5 to 2 percent (w./v.).

Cysteine is desirably present in a liquid culture medium at a concentration of 0.005 to 0.2% w./v., most preferably less than 0.1%, but the optimum concentration varies inversely with the culture volume, for example, 0.1% (w./v.) cysteine for a medium volume of 5 ml. and 0.02% (w./v.) cysteine for a volume of 500 ml. The pancreatic material is advantageously present in the culture medium at a concentration in the range of 1.2 to 3.6% (w./v.), the weight referring to the dissolved solids of pancreatic material.

The concentrations of the ingredients specified above apply to both the final liquid culture medium for large-scale culture of the organism and to the liquid media used for sub-culture and preparation of the inoculum for large-scale culture. With the exception of the cysteine ingredient, the same substances at the concentrations indicated may be included in a solid medium, for example agar, for the purposes of initially isolating the organism from infective material.

The liquid culture media are prepared most conveniently by dissolving the ingredients in distilled water prior to sterilisation (for example by autoclaving), and then adding all or a portion of the cysteine since this material is unstable. The pH of the medium is desirably adjusted to 7.0 to 7.8 and the temperature from 35° to 39° C. Preferably, the liver material should be kept separate from the other ingredients during any dissolving, heating and clarifying processes that precede autoclaving to produce the final sterile medium which may be inoculated with a seed culture. The resulting medium is a preferably homogenous solution of the ingredients substantially free from suspended insoluble materials.

During the culture of the organism it is necessary to provide anaerobic conditions, and it is advantageous to bring this about by using an atmosphere of 100 percent carbon dioxide, which may be provided by merely displacing the air above a liquid medium with sterile carbon dioxide. The presence of this gas in the atmosphere above a culture medium of *F. nodosus* has been found important in accelerating the rate of growth, of at least some strains of the organism, but the precise effect has been found to vary with the strain employed, the percentage of carbon dioxide used, the culture-history of the organism, and the ratio of the volume of gaseous to liquid phase. In general it has been found that the higher the concentration of carbon dioxide, the more rapid is the growth of *F. nodosus*. Good growth of the organism has been obtained using concentrations of 60, 80, 90, 95 and 100 percent carbon dioxide, at standard pressure, the remainder of the atmosphere (where appropriate) consisting essentially of a chemically inert gas such as nitrogen, argon or helium. Although hydrogen has been employed as the remaining gas in small scale experiments, it is of course impractical for use on a manufacturing scale, and the term an "inert gas" as used herein, does not include hydrogen and gases capable of chemical reaction with the culture medium or harmful to the organisms.

The gas/liquid ratio has also been found to affect the rate of growth of the organism where a liquid culture is employed, and in general the volume of carbon dioxide at standard pressure should not exceed 30% of the volume of liquid culture; preferably the volume of carbon dioxide is 10 percent of the volume of the liquid, does not exceed 20 percent, and should not be less than 5 percent.

The inclusion of carbon dioxide in the gas space above a liquid medium will of course result in at least some of the gas dissolving in the medium and lowering its pH from that initially employed. It will also result in a partial vacuum to an extent depending upon the conditions employed, and the culture vessel may be hermetically sealed or provided with a source of inert gas to supplement the solubilised carbon dioxide.

It is desirable that the final culture of *F. nodosus* organisms to be processed into a vaccine should contain a maximum proportion of live, healthy organisms. This requires that the final culture should be grown in the minimum time possible, which, in turn, necessitates the use of the largest inoculum conveniently possible for the final culture. Likewise, the seed organisms for the inoculum should contain a high proportion of viable organisms. In consequence, it is desirable to progressively increase the number of organisms from the original seed material by a series of cultures.

To this end, the organism may be first isolated by culturing under anaerobic conditions suitable infective material on a solid medium containing a liver digest, infusion or extract. Subculture from this first culture is conveniently continued until the organism is obtained as a pure culture. This is generally achieved by one or two subcultures on a solid medium using conditions and materials, as appropriate, similar to those described above for liquid medium cultivation.

The solid medium conveniently consists of agar plates comprising a pancreatic autodigest or Difco trypsin 1:250, peptone, sodium chloride and agar, in addition to the liver material referred to above, at a pH of 7.0 to 7.8. Thus, for example, a suspension of infective material from the lesions of ovine foot-rot in a 0.1 to 0.4 M sucrose solution may be sown on the agar plates and the plates incubated at a temperature between 35° C. and 39° C. in an atmosphere of carbon dioxide and nitrogen for several days.

When a pure *F. nodosus* culture is obtained from solid media growth, this may be used as an inoculum for an anaerobic liquid culture growth of the organism under an atmosphere of carbon dioxide, which is continued by successive subcultures until sufficient organisms are produced to give a final inoculum for a production batch, which, for economical reasons, involves the use of a large volume of the liquid medium, which may be in the order of 500 litre, and inevitably exceeding 5 litre. The successive sub-cultures in liquid media are preferably carried out under the conditions described hereinafter for a large-scale production batch and using media of identical composition.

The finally constituted medium may be used in the following way for producing large quantities of organisms for vaccine production. The liquid medium, containing above-described ingredients, is conveniently placed in large glass vessels or stainless steel tanks. An inoculum (preferably a liquid culture of *F. nodosus* prepared as described above) having a volume of 5 to 10% of the liquid medium is added to the latter. Preferably, the air above the medium is wholly displaced by sterile carbon dioxide, and the sealed vessel then incubated for 12 to 30 hours, after which time the growth is sufficiently dense for vaccine production, a density of about $10^8$ to $10^{10}$ organisms per ml. being most advantageous. Using optimum conditions for growth, a satisfactory harvest can be obtained within 12 hours, but the optimum period will of course vary with the strain of organism grown and the conditions employed. The culture is checked for purity by its microscopic appearance and its cultural characteristics as described hereinafter in Example 1.

If it is desired to maintain a pure culture of *F. nodosus,* this is preferably done by repeated sub-culture on a solid agar medium, since growth is slower on solid media, and thus the life of the organism longer. Alternatively, the organisms may be removed from a solid culture medium, suspended in sucrose solution, freeze-dried and sealed under vacuum. When needed, the dried organisms may be reconstituted with any nutrient broth and recultured under anaerobic conditions on a solid medium containing a liver digest, infusion or extract. In this way it is possible to provide a reservoir of *F. nodosus* organisms for any purpose.

The culture conditions specified hereinbefore have been found particularly valuable for growing two strains of *F. nodosus*: strains Nos. 183 and 198 of the McMaster Laboratory of the Commonwealth Scientific Industrial Research Organisation, Sydney, Australia.

A production-batch of organisms, produced in the manner described above, may be formulated into a vaccine by any known method. It is necessary first to kill the organisms, and this may be done by any customary method, for example by the use of formalin, 0.2 to 1% (v./v.). The killed organisms may then be combined with an adjuvant for enhancing the immune response to the organisms. To this end, a killed whole culture, or the killed harvested organisms, may form the antigenic material for the vaccine. Suitable adjuvants have been described in U.K. Patent specification No. 1,143,545 and may also be used as adjuvants for vaccines of *F. nodosus* cultures prepared in the manner described herein. Advantageously, the culture is admixed with a non-ionic hydrophilic emulsifier, for example polyoxyethylene sorbitan monooleate, and then emulsified in a mineral oil containing a non-ionic lipophilic emulsifier, such as mannide monooleate, and then rendered sterile, to provide a water-in-oil emulsion of the organisms dispersed in the aqueous phase.

It is preferred however to use an aluminium adjuvant to enhance the immunogenicity of the antigens, and potash alum has been found especially suitable, though other aluminium salts, commonly employed in vaccines, may be used. The vaccine desirably contains a bacteriostat of the kind generally employed in killed bacterial vaccines, and 0.01% (w./v.) thiomersal (sodium ethylmercurithiosalicylate) may be incorporated for this purpose.

The vaccines of the present invention are desirably administered to animals by subcutaneous or intramuscular injection. It is believed to be advantageous however to administer an aluminium-adjuvenated vaccine by the subcutaneous rate, and to administer an emulsion-adjuvenated vaccine either intraperitoneally or at a site where local reaction upon subcutaneous administration is of little concern to the farmer. The most preferred dosage range is between $10^8$ and $10^{10}$ killed organisms per dose, in particular between $5 \times 10^8$ and $5 \times 10^9$ per dose, wherein the dose is the total quantity of antigenic material administered to an animal such as a sheep in a suitable volume of liquid. The dose may be administered to an animal as one unit or as a multiplicity of sub-doses; the latter may be administered over a period of time, or by simultaneous injections of the sub-doses at different sites. A suitable immunisation schedule would be a single injection of the dose, one injection of a sub-dose followed after fourteen days by a second injection of a sub-dose, or two injections, each comprising a sub-dose, given simultaneously at different sites on the animal. The optimum dosage schedule will of course vary according to the strains of organism chosen for the basis of the vaccine, the total number of organisms employed, the nature of the adjuvant and the route of administration. It has been found practical to administer an aluminium-adjuvenated vaccine containing $2.5 \times 10^9$ organisms/ml. in a single 4 ml. dose by the subcutaneous route followed by a second injection of the same volume and route at an interval of 6 weeks. If longer protection is required, then booster doses should be given at 6 monthly intervals.

In addition to containing antigenic material derived from *F. nodosus,* a vaccine of the present invention may also contain antigenic material derived from other bacteria that are causative organisms of diseases in, for example, sheep, in particular *F. necrophorus,* or clostridia. A particularly preferred combination is a multiple component vaccine comprising a water-in-oil emulsion preparation or a potash alum adjuvenated preparation of one or more clostridial antigens described in U.K. patent specification No. 1,143,545, in association with a *F. nodosus* antigenic preparation produced as hereinbefore described.

TABLE I

| Medium | | Optical density | | | | | |
|---|---|---|---|---|---|---|---|
| | | Strain 183 | | | Strain 198 | | |
| Liver, percent (w./v.) | Pancreas, percent (v./v.) | 1 | 2 | Mean | 1 | 2 | Mean |
| 0 | 0 | .060 | .063 | .062 | .092 | .090 | .091 |
| 0 | 20 | .33 | .33 | .33 | 26 | .26 | .26 |
| 1 | 20 | .395 | .39 | .395 | .38 | .37 | .375 |
| 1 | 30 | .435 | .43 | .435 | .41 | .415 | .415 |
| 2 | 20 | .39 | .395 | .395 | .43 | .455 | .44 |

The effect of the presence of liver material on the growth of *F. nodosus* in a liquid medium is shown in Table (I). Two series of cultures, each for strain 183 and 198, were grown at 37° C. under an atmosphere of 5% $CO_2$ in nitrogen in a liquid medium having a composition of 2% (w./v.) of a peptone digest and 0.3% (w./v.) of sodium chloride, in addition to the liver and/or pancreatic digest content shown in the Table. The organisms were cultured overnight and the optical density of the resultant medium measured with a Spectrometric 20 spectrophotometer (Bausch & Lomb) to provide the optical density figures. From the Table it can be seen that the maximum growth of strain 183 took place with 1% liver and 30% pancreas, whereas maximum growth of strain 198 occurred with 2% liver and 20% pancreas.

The present invention therefore provides a method for the cultivation of *F. nodosus* which comprises culturing the organism under anaerobic conditions in a vessel which contains a liquid nutritive medium for the organism and a gas space above the medium, the medium containing in solution a liver extract, digest or infusion, and the gas space containing essentially carbon dioxide, or a mixture of carbon dioxide and an inert gas (as hereinbefore defined) containing at least 60 percent by volume of carbon dioxide, the total volume of carbon dioxide in the gas space not exceeding 30 percent of the volume of the liquid medium.

In another aspect, the present invention provides a method for the cultivation of *F. nodosus* which comprises culturing the organism under anaerobic conditions in a vessel which contains a liquid nutritive medium containing in solution crude trypsin or a digest of pancreas, and also containing in solution a liver digest, extract or infusion.

In a further aspect, this invention provides a method for the cultivation of *F. nodosus* which comprises culturing the organism under anaerobic conditions in a vessel which contains a liquid nutritive medium and a gas space above the medium, the gas space containing essentially carbon dioxide or a mixture of carbon dioxide and an inert gas (as hereinbefore defined) containing at least 60 percent by volume of carbon dioxide, the volume of carbon dioxide in the gas space not exceeding 30 percent of the volume of the liquid medium.

In yet another aspect, this invention provides a method for the cultivation of *F. nodosus* which comprises culturing the organism under anaerobic conditions in a vessel which contains a liquid nutritive medium for the organism and a gas space above the medium, the gas space containing at least 80 percent by volume of carbon dioxide, the balance of the gas if any comprising essentially an inert gas (as hereinbefore defined).

In another aspect, this invention provides an *F. nodosus* vaccine comprising a sterile preparation of killed *F. nodosus* organisms which have been cultivated in the manner described herein; it also provides a method of preparing such a vaccine, and a method for the prophylaxis or treatment of food-rot in sheep comprising the immunisation of sheep with a vaccine of killed *F. nodosus* organisms which have been cultivated in the novel manner disclosed herein.

EXAMPLE 1

(a) Isolation of organism

Infective material was isolated from the lesions of ovine foot-rot, suspended in a 0.25 M aqueous sucrose solution and immediately sown onto agar plates having the following composition:

10% (v./v.)[1] Ox pancreas autodigest
1% (w./v.) Proteose peptone
1% (w./v.) Ox liver digest
0.5% (w./v.) Sodium chloride
1.5% (w./v.) Agar.

[1] Equivalent to about 1.2% w./v. of dissolved solids of pancreatic material.

The pH of the solid nutritive medium was 7.4. The plates were incubated at 37° C. in an atmosphere of 5% carbon dioxide in nitrogen for four days.

After incubation, the agar plates were found to contain small, flat, spreading colonies typical of *F. nodosus*. In smears made from the colonies and examined microscopically, a Gram-negative bacillus with the characteristic dumbell shape of *F. nodosus* was present.

Material grown on the agar plates was transferred to further agar plates of the same composition, which were then incubated under the same conditions for three days before being examined. The bacterial growth on the plates was checked for characteristic features to identify the organism; the colonial appearance, the appearance of the organisms in Gram-stained smears and the odour, similar to that of mammalian semen, were all characteristic of *F. nodosus*. The identity of *F. nodosus* was then confirmed by its inability to grow on agar under aerobic conditions or on ordinary nutrient agar, its ability to grow on agar containing 5 to 10% horse blood but not sheep blood, and its ability to cause foot-rot when applied to the interdigital skin of sheep whose feet had been macerated and exposed to faecal contamination with *F. necrophorus*. The organism was maintained by repeated subculture on agar as described above.

Organisms from the second subculture were removed from the agar, suspended in 0.25 M aqueous sucrose solution and then freeze-dried and sealed under vacuum. The seed material was stored until required for vaccine production,

(b) Subculture of organism and preparation of inoculum in liquid media

The cultivation of *F. nodosus* for vaccine production was initiated by reconstituting in 0.25 M aqueous sucrose solution the dried organisms as prepared above, and sowing them on agar, and then transferring the growth thereon into an aqueous liquid medium having the following composition:

1% (w./v.) Ox liver digest
10% (v./v.)[1] Ox pancreas autodigest
1% (w./v.) Proteose peptone
0.5% (w./v.) Sodium chloride
0.05% (w./v.) L-cysteine hydrochloride (added as a sterile 10% solution after the medium was autoclaved).
Distilled water to volume.

[1] Equivalent to about 1.2% w./v. of dissolved solids of pancreatic material.

The pH of the medium before autoclaving was 7.4. The organisms were incubated in a small volume of the medium at 37° C. for 24 hours; the resulting culture was then introduced into a larger volume of the liquid medium, for example, on an experimental basis, 500 ml. of the same medium, (except that the concentration of cysteine was 0.02% (w./v.) and that of the pancreas autodigest 20% (v./v.), that is about 2.4% (w./v.) of dissolved solids of pancreatic material contained in a one pint glass blottle. A further incubation was carried out under the same conditions, and in each case carbon dioxide gas was introduced into the air space above the medium through a sterile plug of cotton wool until most of the air was displaced. For example, using the one pint bottle with an air space of approximately 50 ml., carbon dioxide gas was introduced for about 15 secs. through a 2 ml. sterile pipette plugged with cotton wool. The culture was checked microscopically for purity, that is for the presence of a micro-organism other than *F. nodosus*.

(c) Large-scale culture of the organism

The contents of one 1 pint bottle was then inoculated into 12.5 litres of the liquid medium of the same composition [except that the concentration of cysteine was 0.01% (w./v.) and that of the pancreas autodigest was again 2.4% (w./v.), that is 20% (v./v.)] contained in a 15 litre glass vessel.

The air in the vessel was wholly displaced with carbon dioxide gas, introduced through a sterile line filter, and the vessel was then hermetically sealed and incubated at 37° C. for 20 hours, after which time the growth was sufficiently dense, that is the culture contained about $2\times10^9$ organisms/ml. Samples of the culture were taken and checked for purity by the microscopic appearance and cultural characteristics of the organism, as hereinbefore described for the determination of the purity of the organisms grown on agar plates.

EXAMPLE 2

Preparation of an *F. nodosus* Vaccine

A liquid culture of *F. nodosus* was produced by the large-scale method described in Example 1(c). The antigenicity of the cells was tested by mixing on a slide a drop of the culture with a drop of anti-serum to *F. nodosus* raised in a rabbit. The organisms agglutinated immediately, and thus were sufficiently antigenic for vaccine production. Formalin (0.6% v./v.) was added to the whole culture, and the culture was then allowed to stand at room temperature for three days, and thiomersal (0.01% w./v.) added. The inactivated material was then made into a vaccine; sorbitan monooleate was dissolved in the culture at a concentration of 5% (v./v.), and 3 parts by volume of the resulting suspension were emulsified in 7 parts of an oil mixture consisting of 10% (v./v.) mannide monooleate in the light liquid paraffin oil, Bayol F (Registered Trade Mark). The vaccine was put into suitable vessels under sterile conditions and the vessels sealed. The product was stored until required for use.

The potency of the vaccine produced was determined by injection of two 1 ml. doses of the undiluted vaccine into 4 rabbits at an interval of 2 weeks. The rabbits were bled 2 weeks after the second dose and their sera tested at dilutions of 2,500, 5,000, 10,000 etc. up to 320,000; each sample of serum was subjected to an agglutination test with a suspension of *F. nodosus* in 0.85% (w./v.) sodium chloride solution at a density equivalent to tube 1 on the Brown opacity scale (Burroughs Wellcome & Co.). The vaccine induced a mean agglutinin titre of 48,000, and was sufficiently potent for subsequent vaccination of sheep.

EXAMPLE 3

Preparation of an *F. nodosus* Vaccine

*F. nodosus strain* 183 and 198 organisms were cultured in the manner described in Example 1(c), and the organisms inactivated with formalin as described in Example 2. Equal volumes of the anaculture of each strain were blended together, and aqueous solutions of potassium aluminium sulphate and thiomersal were added to provide concentrations of 2% w./v. and 0.01% w./v. The resulting vaccine was sterilised and filled into phials, each containing 4 ml. of vaccine with $2.5 \times 10^9$ organisms/ml. The vaccine was suitable for immunising sheep according to a dosing schedule of a single subcutaneous injection of 4 ml., followed by the same dose subcutaneously 4 to 8 weeks later.

What I claim is:

1. A method for the cultivation of *Fusiformis nodosus* which comprises culturing the organism under anaerobic conditions in a vessel which contains a liquid nutritive medium containing in solution crude trypsin or a digest of pancreas, and also containing in solution a liver ingredient selected from a liver digest, a liver extract or a liver infusion.

2. A method as claimed in claim 1 wherein the liver (ingredient) comprises from 0.5 to 2 percent by weight of the volume of the medium, said weight referring to the liver ingredient solids.

3. A method as claimed in claim 1 wherein the digest of pancreas is present in an amount of 1.2 to 3.6 percent by weight of the volume of the medium, said weight referring to the solids of pancreatic material.

4. A method as claimed in claim 1 wherein the liquid medium contains in solution one or more ingredients of the class consisting of sodium chloride, proteose peptone, mammalian muscle digest, yeast extract, and cysteine.

5. A method as claimed in claim 1 wherein the pH of the medium at the initiation of cultivation is from pH 7.0 to pH 7.8.

6. A method as claimed in claim 1 wherein the cultivation is conducted at a temperature of about 37° C.

7. A method as claimed in claim 1 wherein a gas space is provided above the medium, said gas space consisting essentially of carbon dioxide or a mixture of carbon dioxide and an inert gas different from carbon dioxide.

8. A method as claimed in claim 7 wherein the gas space contains at least 60 percent by volume of carbon dioxide, (the balance of gas if any consisting essentially of an inert gas different from carbon dioxide.

9. A method as claimed in claim 7 wherein the gas space contains at least 80 percent by volume of carbon dioxide, the balance of the gas if any consisting essentially of an inert gas different from carbon dioxide.

10. A method as claimed in claim 7 wherein the volume of carbon dioxide in the gas space comprises between 5 and 30 percent of the volume of the liquid medium.

11. A method as claimed in claim 1 wherein the crude trypsin is present in an amount of about 0.5 to 2% by weight of the volume of the medium.

References Cited

H. Marsh et al., the Cornell Veterinarian, 60, pp. 309–317, April 1970.

J. H. Thomas, Australian Veterinary Journal, Vol. 39, No. 11, pp. 434–437; November 1963.

D. Roberts et al., J. Comp. Path, Vol. 79, pp. 217–227; 1969.

ROBERT J. WARDEN, Primary Examiner

U.S. Cl. X.R.

195—99, 100, 101